United States Patent [19]

Weyer

[11] 3,773,036
[45] Nov. 20, 1973

[54] DISPOSABLE BLOOD PRESSURE CUFF
[75] Inventor: James H. Weyer, Afton, Ohio
[73] Assignee: Minnesota Mining and Manufacturing Co., St. Paul, Minn.
[22] Filed: Dec. 2, 1971
[21] Appl. No.: 203,995

Related U.S. Application Data
[63] Continuation-in-part of Ser. No. 876,778, Nov. 14, 1969, abandoned.

[52] U.S. Cl............................................ 128/2.05 C
[51] Int. Cl............................................... A61b 5/02
[58] Field of Search................. 128/2.05 A, 2.05 C, 128/2.05 G, 2.05 M, 2.05 P, 2.05 Q, 2.05 R, 128/2.05 S, 2.05 V, 2.05 Z, 325, 327

[56] References Cited
UNITED STATES PATENTS
2,271,927  2/1942  Saighman........................... 128/327
2,758,593  8/1956  Berman........................... 128/2.05 C
2,841,149  7/1958  Marsden......................... 128/2.05 C
3,467,077  9/1969  Cohen............................. 128/2.05 C
3,513,831  5/1970  Hirsch............................. 128/2.05 C
2,981,251  4/1961  Berman........................... 128/2.05 C OTHER PUBLICATIONS
Hammer et al. "IBM Technical Disclosure Bulletin," Vol. 8, No. 4, September, 1965, p. 593.

Primary Examiner—William E. Kamm
Attorney—Kinney, Alexander, Sell, Steldt & Delahunt

[57] ABSTRACT

A one-piece, disposable blood pressure cuff comprising two layers of a flexibly pliable, elongated, thermoplastic polymer film peripherally bonded together to form an inflatable pocket therebetween, the outer film of said cuff being capable of withstanding a tensile force of 10 pounds per inch of width and capable of withstanding pressures of 300 mm. of Hg at inflation without elongating more than 20 percent. The inner film of said cuff must be capable of withstanding a tensile force of 5 pounds of force per inch of width and have an elongation of 20 percent or less when the cuff is inflated to a pressure of 300 mm. Hg. The inner elongated film layer is attached to a nontoxic, nonirritating substrate suitable for contact with human skin, said substrate having a compressibility of less than 3/16 inch. The cuff has means for the introduction and evacuation of air from the pocket, means to hold a blood pressure cuff transducer on said substrate and against the skin and means to attach the end of the cuff onto a portion of itself when overlapped and convolutely wrapped around an appendage, thus holding the cuff on during the measurement of a patient's blood pressure.

9 Claims, 8 Drawing Figures

PATENTED NOV 20 1973

INVENTOR.
JAMES H. WEYER
BY Kinney, Alexander,
Sell, Steldt & DeLaHunt
ATTORNEYS

DISPOSABLE BLOOD PRESSURE CUFF

BACKGROUND OF THE INVENTION

This is a continuation-in-part of co-pending application Ser. No. 876,778, filed Nov. 14, 1969, now abandoned.

The invention relates generally to a one-piece, disposable blood pressure cuff for measuring blood pressure adapted to be convolutely wrapped around an appendage and which can be subsequently discarded. More particularly, the invention relates to a disposable blood pressure cuff made of two layers of a soft, pliable, thermoplastic polymer film periphery bonded together and providing an inflatable bladder for all or a portion of the length thereof, the skin-contacting surface of the cuff being surfaced with a soft, porous, moisture vapor permeable material, such as a fine sponge, textile, nonwoven fabric, or the like.

The measurement of blood pressure with blood pressure cuffs consists of tightening the cuff about the upper arm and obtaining readings of the systolic pressure, which is the greatest or peak pressure of the blood in an artery during a heartbeat, and the diastolic pressure, which is the pressure of the blood in an artery between heartbeats. The blood pressure cuff has attached to it a device for measuring the pressure of the air in an inflatable bladder usually carried as a separate unit within the cuff. A stethoscope is used with the cuff to monitor the sounds the blood makes when passing through the constricted artery. The stethoscope is generally used adjacent to the cuff on the arm and not at the precise site of arterial constriction. The bladder is then slowly released until the needle on the blood pressure measuring device begins to bounce indicating blood is beginning to pass through the constricted artery at a certain pressure, which pressure is considered the systolic pressure. The diastolic pressure is much harder to determine but is generally considered to be about at that point where the needle ceases the bounce during reduction of the pressure.

A problem that exists with presently used blood pressure cuffs is cross-contamination between patients. Blood pressure cuffs generally comprise a cloth-like cover into which a rubber bladder is inserted. As a physician normally takes numerous blood pressure readings during a short period of time, the cover on the cuff is placed on the arm of many patients without any interim sterilization procedures being used to minimize the possibility of passing contamination from patient to patient.

An example of presently used blood pressure cuffs is shown in U.S. Pat. No. 3,567,077, where two plies of woven nylon fabric are stitched together to form a hollow body suitable for the insertion of a bladder. The insertable bladder will have means for inflation and deflation and when said bladder is inserted in the hollow body, the assembled parts form a blood pressure cuff. It is also disclosed, but not as a preferred embodiment, that a hollow body could be formed from thermoplastic films. Merely heat bonding two layers of plastic together, however, is not sufficient. The prior art does not disclose a range of critical parameters for thermoplastic films necessary to form a one-piece, disposable blood pressure cuff, since the prior art cuffs are designed to be used with an inflatable bladder and, consequently, the physical properties of the films are of slight importance. Where a blood pressure cuff is formed as an integral unit, the film layers defining the cuff must possess a certain strength to allow proper inflation of the cuff while maintaining conformability while in use.

A further problem is that during surgery and in intensive care wards, it is often desirable to keep the blood pressure instruments on the arm for long periods of time so that blood pressure may be frequently measured.

When the blood pressure cuff is left in place for extended periods of time, it is desirable that a thin, vapor permeable layer integrally bonded to the blood pressure cuff be placed next to the patient's skin. The presently used blood pressure cuffs are not satisfactory for this purpose as they are relatively heavy and bulky, causing the patient to perspire with no escape for this moisture, which may cause severe discomfort. It is not sufficient merely to place a layer of soft material on that portion of the cuff which contacts the patient's skin, the material should allow the passage of vapor, be lightweight, and not have a large compressible thickness which would hamper the swift and accurate measurement of the blood pressure. Where there is insufficient vapor transport, or the vapor-permeable layer is heavy, leaving the blood pressure cuff in place for extended periods, it will result in discomfort to the patient. Conversely, if the vapor-permeable layer is too thick, large amounts of air will be required to properly inflate the blood pressure cuff which causes an undesirable increase in time necessary to take a blood pressure reading.

The mere addition of open mesh fabrics as taught by Hammer, "IBM Technical Disclosure Bulletin" V. 8, No. 4, page 593, or foam as taught by U.S. Pat. No. 2,271,927 will not cure the weight and comfort deficiencies of the prior art cuffs since not all fabrics and foams are vapor permeable, light in weight, and suitable for contact with a patient's skin over extended periods.

Further, it would be desirable that each patient has his own personal cuff when in isolation or intensive care. To applicant's knowledge, there is no one-piece, lightweight, complete, disposable blood pressure cuff available at the present time fulfilling the requirements noted heretofore.

SUMMARY OF THE INVENTION

According to the present invention, a disposable, one-piece blood pressure cuff is provided which is lightweight and comfortable to the patient, is inexpensive, and can be efficiently manufactured on high speed automatic equipment. The novel cuff virtually eliminates cross-contamination between or among patients and, thus, is particularly suited for use in isolation. The one-piece cuff is further suited for use in the operating room as it may be left on the patient's arm for extended periods of time without being attached to a stethoscope or a monitoring device until use is desired, at which time said devices may be conveniently attached.

The new one-piece, disposable cuff of the present invention generally comprises an outer layer of an elongated, generally rectangular strip of thermoplastic polymer film having a minimum tensil strength of 10 pounds per inch of width, which can withstand inflation pressures of up to 300 mm. Hg. without elongating more than 20 percent or exceeding the elastic limit; a second inner, generally rectangular layer of thermoplastic polymer film overlying at least a portion of said first layer, the second layer having a minimum tensile strength of 5 pounds per inch of width and capable of withstanding inflation pressures of 300 mm. Hg without elongating more than 20 percent or exceeding the elastic limit, the two layers being sealed together about a perimeter to provide at least one inflatable pocket between said first and second layers; connecting means projecting from said second layer for inflation of said pocket; a third layer of a soft, porous, conformable, moisture vapor permeable, hypoallergenic material surfacing the back of said second layer for contact with the skin, said layer having a compressibility of from about 1/64 to about 3/16 of an inch, and means to hold an audio-pickup transducer onto said third layer. Upon use, the inflatable pocket portion is placed on the appendage and the remainder of the cuff is convolutely wrapped around the appendage and itself to prevent bursting of the bladder when inflated. A portion of the cuff has a coating of pressure-sensitive adhesive thereon to anchor it to that portion of the cuff with which it comes in contact when the cuff is wrapped over itself.

The objects and features of the present invention will be more fully understood with reference to the drawings wherein.

Figure 1:
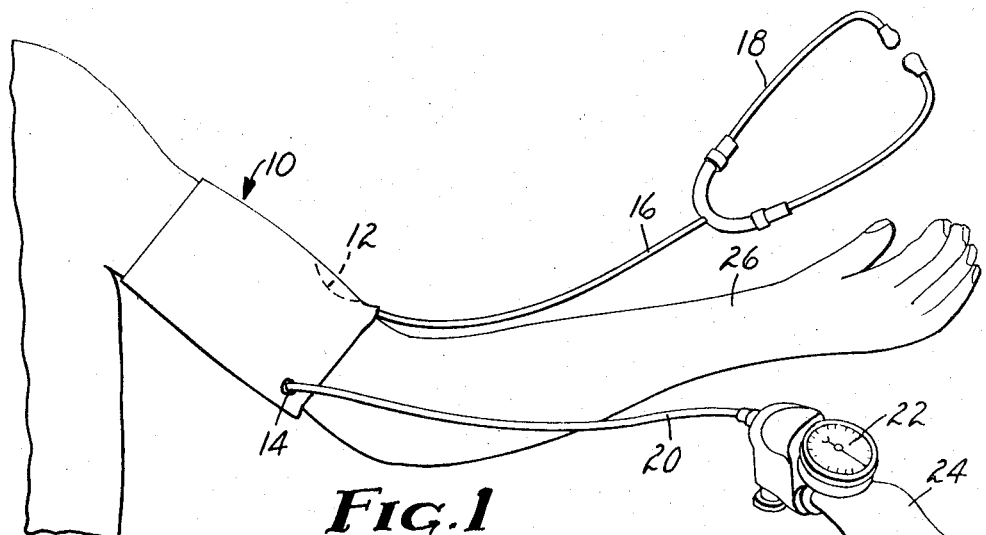
FIG. 1 is a view of the one-piece blood pressure cuff as it is used while attached to monitoring devices.

With reference to the drawings, FIG. 1 is an illustration of a blood pressure cuff 10 made in accordance with the invention, wrapped around the arm of a subject and having attached thereto a stethoscope audio-pickup 12, and an inflating means 14 equipped with a pressure-responsive gauge 22.

Figure 2:
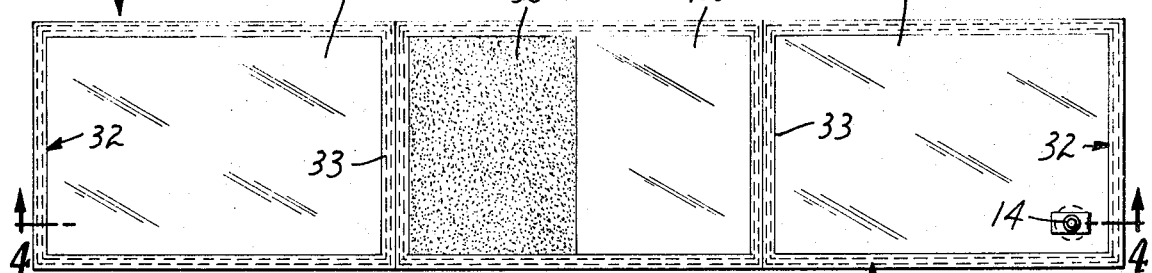
FIG. 2 is a perspective view of the outer surface on the cuff.
Figure 3:
FIG. 3 is a cross section of the cuff.

The construction of the cuff is best illustrated in FIGS. 2 and 3, the cuff comprising top and bottom layers 28 and 29 respectively of a flexible, nonporous, thermoplastic, polymeric film, such as polyethylene or other plastic. These layers are sealed to one another about their periphery of the cuff as at 32, and are further heat sealed to one another at spaced intervals 33 along the length of the cuff, thus forming three pockets having sealing perimeters at 33 and 32. A soft, nontoxic, nonirritating, porous, moisture vapor permeable substrate 36 is attached to one layer 29 along about two-thirds of its length. This soft area contacts the skin during use allowing the cuff to be quite comfortable while on the patient's arm and allows the evaporation of moisture vapor from the skin. A portion of the cuff on the end wherein the nonirritating substrate 36 is attached thereto forms a bladder or pocket 31 between the inner layer 29 and the outer layer 28. An air stem 14 is attached near the end of the section forming the bladder to allow the passage of air in and out of the bladder 31. Air is inserted into the bladder by means of a pressure bulb 24 and tube 20 attached to the stem 14 and, upon release of the air pressure, a reading is taken on a readout dial 22 as illustrated in FIG. 1.

Although these pockets are illustrated between the film layers, each pocket sealed around its perimeter, only one functions as the bladder depending upon where the air stem is attached. The three pockets are formed only because it is easier to manufacture the cuff using two pieces of film of similar size to form the bladder 31 and the remainder of the cuff rather than forming a bladder and thereafter attaching a thicker single piece of film thereto to form the remainder of the cuff. Similarly, a single piece of film folded centrally and sealed at its edges will work satisfactorily, although two separate pieces of film are preferred for manufacturing purposes.

The soft, conformable layer 36 has two slits (not shown) inserted therein which hold an audio-pickup transducer 12 which in turn is connected by means of a tube 16 to a stethoscope headset 18. On the side opposite the soft layer 36, a small area of pressure-sensitive adhesive 30 is attached to the central third of the cuff which serves to anchor the cuff when convolutely wrapped over itself around an appendage and, thus aids in holding the cuff securely on the appendage.

The materials forming the cuff must be pliable enough so that the walls of the bladder can comply to the introduction of air therein, but strong enough so that the walls will not burst. The outer film 28, in order to perform adequately, must withstand a tensile force of 10 pounds per inch of width without exceeding the elastic limit of the film and without elongating more than 20 percent in order to withstand inflation pressures of 300 mm. of Hg when wrapped around an adult arm. Tensile force as used herein is not to be confused with tensile strength. While tensile strength is constant with a given material, the tensile force is the force required to exceed the elastic limit of a material at a certain thickness. In order to conform to the appendage around which the cuff is wrapped, the stiffness of the outer layer must not exceed 250 mm. when using ASTM Federal Test Method Standard No. 191, Method 5204, entitled "Stiffness of Cloth, Directional Self-weighted Cantelever Method." This test comprises placing a speciman about 1.25 inches wide and about 6 to 12 inches in length between two cylinders in a device which rotates the plane defined by the axes of said cylinders. The measure of directional flex-stiffness shall be the length of the speciman remaining above the nip of the rollers which, when the test instrument is rotated clockwise and counterclockwise through 90° ± 2°, just falls to the left and right of the line perpendicular to the nip of the rolls. A material which has a stiffness value in the range of approximately 50–250 mm. will conform readily to an appendage, and therefore, will produce a blood pressure cuff which gives acceptable blood pressure readings. Films having a Rockwell hardness greater than M120 are too brittle to be used as the outer film of the cuffs, said films being too hard to be wrapped effectively about and conform to an appendage.

The inner film 29 of a blood pressure cuff can have a lower tensile strength than the outer wrap since the appendage provides partial support for the inner film. For the inner film, a tensile force of 5 pounds per inch of width without exceeding the elastic limit and without elongating more than 20 percent is sufficient to form an acceptable blood pressure cuff which will withstand inflation to 300 mm. Hg. Stiffness of the inner film should not be greater than 125 mm. when measured using ASTM Standard No. 191 mentioned hereinbefore in order to assure proper conformability. A Rockwell hardness of less than M120 is necessary to insure comfort and conformability of the cuff. Outer and inner films which have tensile force per inch of width lower than 10 and 5 pounds respectively will result in blood pressure cuffs which burst when inflated or which will expand freely thrreby preventing a sufficient pressure build up to construct an artery to make a pressure reading possible.

The film material should further be nonpermeable to air and heat sensitive so that it may be heat sealed, or in the alternative, it should be receptive to an adhesive or other means of sealing. Examples of materials capable of fulfilling the abovementioned requirements are vinyls, nylon, polypropylene, and other pliable, thermoplastic polymers.

The nontoxic, nonirritating surface 36 which contacts the skin is attached to the bladder 31 and any other portion of the film which contacts the skin. In the drawings, this material covers about two-thirds of the cuff, but may cover the entire cuff or any portion thereof. Fabrics such as nonwoven webs are preferred, but any material which is conformable and nonirritating to the skin may be used, such as cloth, paper, sponge, reticulated foam, or other porous materials. Whichever material is used to form the non-irritating surface 36, the nonirritating layer must have a maximum compressibility approaching 0 to less than 5/16 of an inch. Nonirritating layers with compressibility in excess of 3/16 of an inch require inordinate amounts of air to properly inflate the cuff to 300 mm. of Hg pressure with a consequential undesirable increase in the amount of time required to take a blood pressure reading. When a flexible, open-celled foam is used as the nontoxic, nonirritating surface, foams with a density of under 10 pounds per cubic foot are required since foams of greater density result in a blood pressure cuff which is heavy and uncomfortable.

As noted previously, this material preferably has two slits therein to hold the audio-pickup transducer 12 from a stethoscope when the cuff is placed on the arm, but such slits are not necessary where an ordinary stethoscope is merely placed under or near the cuff. The use of a pickup transducer, however, has proved to be more reliable and convenient when listening to the heartbeats.

An air stem 14 or tube is permanently fixed in the bladder 31 so that air may be introduced into the bladder and later released. The stem 14 may be any type of hollow device, preferably plastic or metal, that is suitably strong to be pushed through the film 28 forming the bladder allowing an impermeable friction fit to be formed between the stem and the adjacent film and preferably capable of being tilted or otherwise brought out to the side of the cuff. In the case of polyethylene film, the film extrudes over and around the inserted stem sealing any spaces formed therebetween. The stem should also be adapted to receive the tubing 20 which connects it to the pressure bulb 24.

An adhesive 30 is attached centrally to the outer surface of the cuff so that when the cuff is convolutely wrapped around itself, the end of the cuff opposite the bladder comes to rest upon the adhesive and adheres thereto, thus, holding the wrapped cuff together and on the appendage. A double-coated, pressure-sensitive adhesive tape is satisfactory for most applications. Any fastener, however, which would allow the cuff to adhere to itself may be used. Examples of such fasteners are adhesive-filled microcapsules or commercially available interlocking fasteners. Where a pressure-sensitive adhesive 30 is used, a protective liner may be placed thereon until use or the portion of the film farthest from the bladder may be folded over the adhesive 30 as protection during packaging and merely unfolded prior to use exposing the adhesive.

When the cuff is to be used to take the blood pressure of a patient, the cuff is unfolded as shown in FIGS. 2 and 3 and the adhesive area 30 is exposed. An audio-pickup transducer 12 is inserted into the two slits (not shown) in the fabric layer 36 which is opposite the stem 14 inserted during manufacture and which area also comprises the bladder 31. The bladder, with the fabric surface carrying the pickup device which is to be surface, is then placed on the appendage 26 where the blood pressure will be taken and the remainder of the cuff is wrapped over the bladder portion 31 and convolutely around the appendage and itself until the end of the cuff contacts the adhesive area 30. The cuff is thus adhered to itself and held on the appendage as illustrated in FIG. 1.

The stethoscope 18 may then be attached to the audio-pickup transducer and the readout device 22 and the pressure bulb is attached to the stem 14 by means of a single tube 20. These attachments may also be made prior to putting the cuff on the appendage. The blood pressure measurement is then taken in the normal manner.

The dimensions of the cuff are quite important. If the pad is too narrow, a great deal of pressure is required to constrict the blood vessels underneath the skin. If too wide, the pressure is distributed over a larger area and will not be sufficient to constrict the vessels for proper blood pressure measurement. For normal adult use, the cuff is about 26 to 28 inches long and about 6 inches wide. The size may vary depending upon the size and physical characteristics of the appendage around which the cuff is to be wrapped. For example, blood pressure cuffs prepared for use with children would be of a smaller size than the dimensions heretofore stated.

Figure 4:
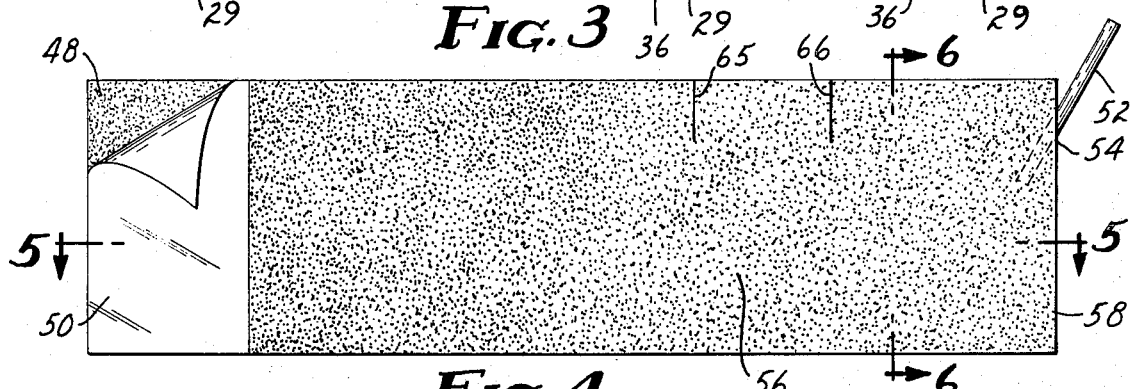
FIG. 4 is a view of a modified cuff which has a reinforced surface.
Figure 5:
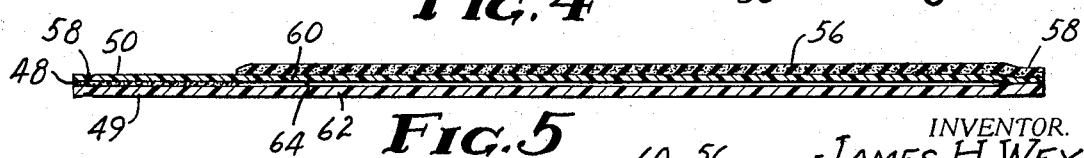
FIG. 5 is a longitudinal cross section of the cuff of FIG. 4.
Figure 6:
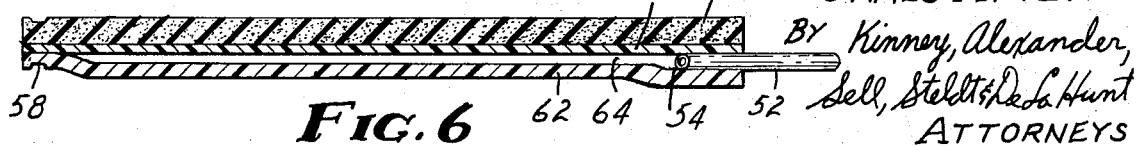
FIG. 6 is a transverse cross section of the cuff of FIG. 4.

The preferred embodiment of the invention is illustrated in FIGS. 4 through 6, a one-piece, disposable blood pressure cuff may be prepared by using a reinforced or non-stretchable film layer over the entire surface of the cuff.

The cuff comprises a first layer of an elongated, generally rectangular sheet of a pliable, thermoplastic polymer film 60; a second elongated, generally rectangular reinforced sheet of thermoplastic polymer film 62 overlying the first layer 60 and sealed thereto about its periphery at 58 to provide at least one inflatable pocket 64, the first layer 60 being further bonded to a nontoxic, nonirritating, soft, porous, hypoallergenic, conformable, moisture vapor permeable material 56 which may be made from any of the materials having the properties heretofore described. The latter material has slits 65 and 66 therein to hold a pickup transducer and a stem 52 is merely inserted through a small opening 54 in the second layer and into the bladder, the stem being held by a friction fit in the film or may be sealed between the film layers. The stethoscope and pickup device may be attached as before. A pressure-sensitive adhesive tape 48 having a protective liner 50 thereon is used to anchor the cuff to itself when wrapped around an appendage. As illustrated, one bladder 64 is formed between the film layers 60 and 62. There may, however, be more than one bladder formed as in the cuff heretofore described. In the illustration, the second film layer 62 is somewhat thicker, thus reinforcing that layer so that the bladder will not rupture upon the introduction of air therein. The reinforcement may be supplied, however, by using other materials in combination with the first polymer film, such as fibrous nylon cross hatching in the film. Various other methods of reinforcing the outer layer of the cuff would be obvious to those skilled in the art.

Figure 7:
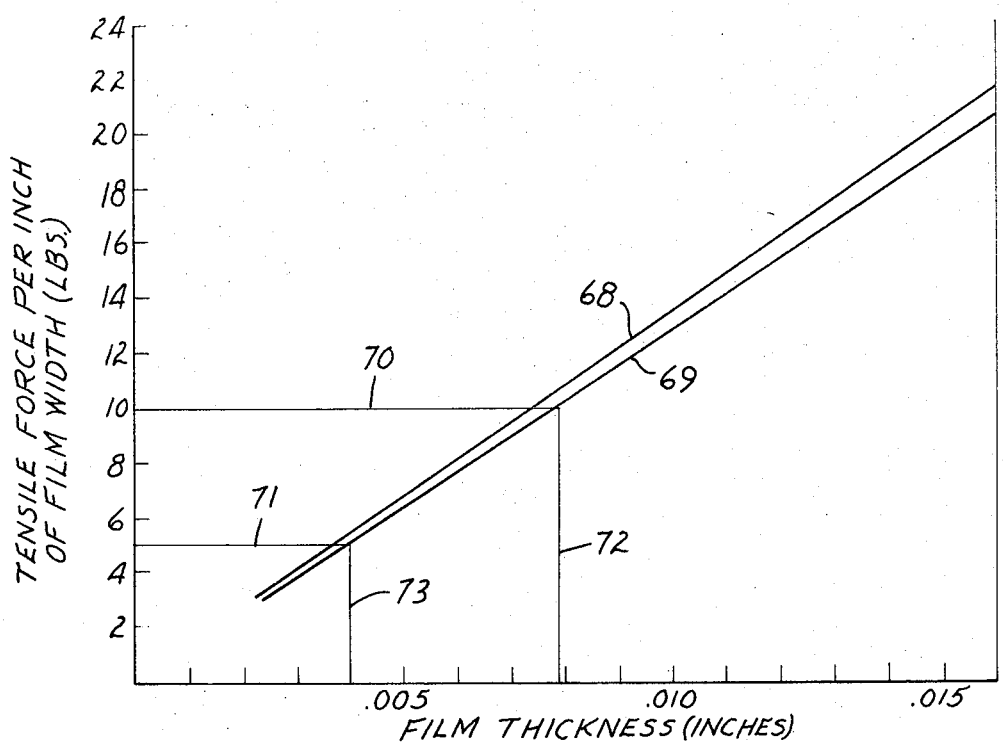
FIG. 7 is a graph showing tensile strength per inch of width in comparison to a certain film thickness for polyethylene.
Figure 8:
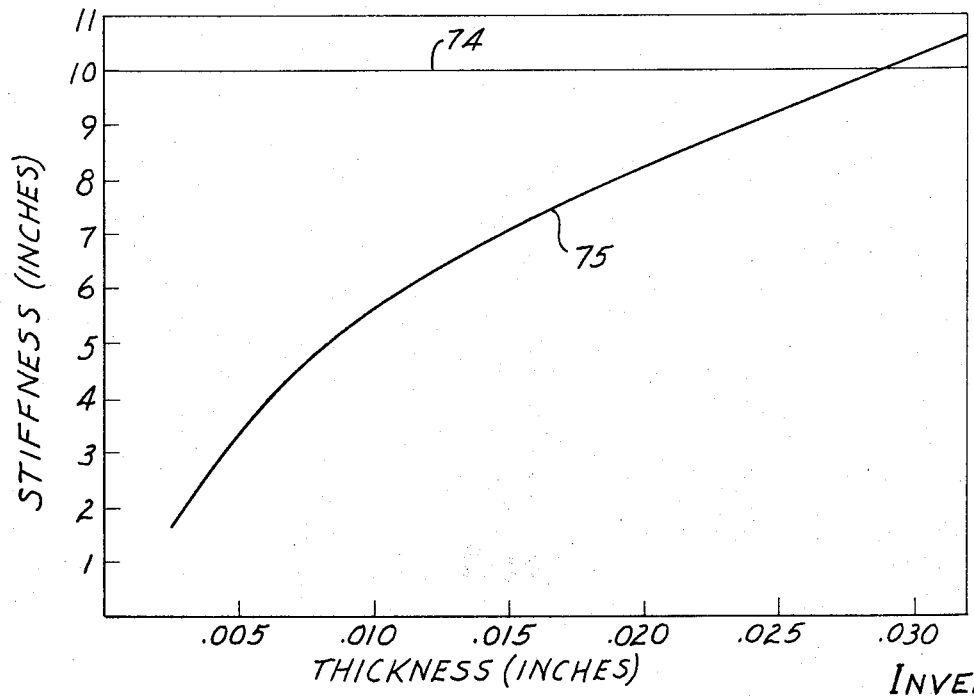
FIG. 8 is a graph showing stiffness versus film thickness for polyethylene.

The graphs illustrated in FIGS. 7 and 8 help to define the parameters of thermoplastic films useful for making an acceptable blood pressure cuff, polyethylene being illustrated therein. In FIG. 7 the tensile force per inch of width necessary to elongate 20 percent is represented by number 68 and the tensile force per inch of width necessary to exceed the elastic limit is represented by number 69, both being plotted as a function of film thickness. The outer film 28 must have a minimum tensile force of at least 10 pounds per inch of width and is represented by line 70. The inner film 29 must have a minimum tensile force of at least 5 pounds per inch of width and is represented by line 71. The minimum acceptable film thickness for the outer and inner layers is represented by vertical lines from the intersection of the aforementioned limits and the lower of the two strength thicknesses (68 and 69), 72 and 73 respectively. The point at which the vertical lines 72 and 73 cross the abscissa represent the minimum acceptable thickness necessary to form an acceptable blood pressure cuff using a particular film.

As illustrated in FIG. 8, an acceptable maximum film thickness for a desired film, compared with stiffness, may be determined with reference to line 75. Films having a stiffness greater than 10 inches, measured as hereinbefore described, and represented by the upper limit 74, are unacceptable. The vertical line from the intersection of the stiffness upper limit 74 and the plot 75 represent the thickest film having the acceptable conformability and stiffness to provide an acceptable blood pressure cuff. Films having greater thickness result in a cuff which lacks the required conformability.

For example, according to the illustration using polyethylene, it is known that the minimum tensile force required for the inner layer of the cuff is about 5, and the stiffness can be no greater than 10 no matter what material is being used. Thus, with polyethylene, the inner film must be at least 0.004 inches thick to provide adequate tensile strength. Similarly, the outer layer must have a minimum tensile force of 10 pounds per inch width no matter what material is used and it can conveniently be determined that the minimum thickness of the outer layer must be at least about 0.008 inch. Looking at FIG. 7, it will be seen that a polyethylene film having a thickness of 0.004 inch and 0.008 inch falls below the stiffness limit of 10 (number 74) and, thus, the thickness of 0.004 inch polyethylene film for the inner layer and a 0.008 inch thick polyethylene outer layer would be suitable for fabricating a blood pressure cuff according to the present invention.

Similar plots for different materials would define the minimum and maximum thicknesses which could be used to form an integral, one-piece, disposable blood pressure cuff and would be within the skill of the art. Since a tensile force for the outer layer must always be at least 10 pounds per inch width and for the inner layer must be at least 5 pounds per inch width, and the stiffness of each layer must be less than 10 inches, the preparation of similar graphs showing the elastic limit and 20 percent elongation point of the material will indicate the minimum required thickness of the film for the two layers. The stiffness of the material can then be charted to show whether the minimum required thickness, based on tensile force, also falls below the maximum stiffness of 10 inches.

What is claimed is:

1. An inflatable, integral, one-piece, disposable blood pressure cuff, comprising:

a first inner layer of an elongated, generally rectangular sheet of thermoplastic polymer film having a minimum tensile force of 5 pounds per inch of width and capable of withstanding an inflation pressure of about 300 mm. Hg without elongating more than 20 percent and having a Rockwell hardness no greater than M120;

a second, generally rectangular outer layer of thermoplastic polymer film overlying at least a portion of said first layer having a minimum tensile strength of 10 pounds per inch of width, capable of withstanding an inflation pressure of 300 mm. Hg without elongating more than 20 percent and having a Rockwell hardness no greater than M120, said first and second layers having a stiffness from about 50 to 250 mm. when measured using ASTM Federal Test Method Standard No. 191, Method 5204, December 31, 1968, said layers being sealed together about a perimeter to provide at least one inflatable pocket between said first and said second layers;

a third layer of a soft, porous, conformable, moisture vapor permeable material having a compressibility of from about 1/64 to about 3/16 inch, said third layer surfacing the back of said first layer for contact with the skin;

means projecting from said second layer for enabling inflation and deflation of said pocket; and means to adhere said cuff to itself when convolutely wrapped around an appendage to hold said cuff thereon.

2. The one-piece, disposable blood pressure cuff of claim 1 wherein said means for inflation and deflation is a hollow stem projecting from said second layer for inflation and deflation of said pocket.

3. The one-piece, disposable blood pressure cuff of claim 1 additionally comprising means to hold an audio-pickup transducer onto said third layer.

4. The one-piece, disposable blood pressure cuff of claim 1 wherein said thermoplastic polymer film is polyethylene.

5. The one-piece, disposable blood pressure cuff of claim 1 wherein said vapor permeable material is a fabric.

6. The one-piece, disposable blood pressure cuff of claim 1 wherein said vapor permeable material is reticulated foam having a density no greater than 10 pounds per cubic foot.

7. The one-piece, disposable blood pressure cuff of claim 5 wherein said fabric is a nonwoven web.

8. An inflatable, integral, one-piece, disposable blood pressure cuff, comprising:
- a first inner layer of an elongated, generally rectangular sheet of a pliable, thermoplastic polymer film having a minimum tensile strength of 5 pounds per inch of width capable of withstanding an inflation pressure of 300 mm. Hg without elongating more than 20 percent and having a Rockwell hardness no greater than M120;
- a second layer of an elongated, generally rectangular outer layer of a pliable, thermoplastic polymer film overlying said first layer and having a minimum tensile strength of 10 pounds per inch of width, capable of withstanding an inflation pressure of 300 mm. Hg without elongating more than 20 percent and having a Rockwell hardness no greater than M120, said first and second layers having a stiffness from about 50 to 250 mm. when measured using ASTM Federal Test Method Standard No. 191, Method 5204, December 31, 1968, said layers being sealed together about a perimeter to provide an inflatable pocket between said first and said second layers;
- a third layer of a soft, porous, conformable moisture vapor permeable material having a compressibility of from about 1/64 to 3/16 inch, said third layer surfacing the back of said first layer for contact with the skin;
- means projecting from said second layer for enabling inflation and deflation of said pocket; and
- adhesive means to attach one end of said cuff to a remaining portion thereof to hold said cuff securely to an appendage.

9. The cuff of claim 8 wherein said polymer film is polyethylene.

* * * * *

UNITED STATES PATENT OFFICE
CERTIFICATE OF CORRECTION

Patent No. 3,773,036      Dated December 18, 1973

Inventor(s) James H. Weyer

It is certified that error appears in the above-identified patent and that said Letters Patent are hereby corrected as shown below:

Col. 5, line 13, "construct" should read "constrict".

Col. 5, line 33 should read "3/16" instead of "5/16".

Signed and sealed this 9th day of April 1974.

(SEAL)
Attest:

EDWARD M. FLETCHER, JR.
Attesting Officer

C. MARSHALL DANN
Commissioner of Patents